US010838472B2

(12) United States Patent
Hadjilambrou et al.

(10) Patent No.: US 10,838,472 B2
(45) Date of Patent: Nov. 17, 2020

(54) POWER ANALYSIS

(71) Applicants: ARM Limited, Cambridge (GB); University of Cyprus, Nicosia (CY)

(72) Inventors: Zacharias Hadjilambrou, Nicosia (CY); Shidhartha Das, Cambridge (GB); Yanos Sazeides, Nicosia (CY)

(73) Assignees: Arm Limited, Cambridge (GB); University of Cyprus, Nicosia (CY)

( * ) Notice: Subject to any disclaimer, the term of this patent is extended or adjusted under 35 U.S.C. 154(b) by 349 days.

(21) Appl. No.: 15/692,282

(22) Filed: Aug. 31, 2017

(65) Prior Publication Data

US 2019/0064896 A1    Feb. 28, 2019

(51) Int. Cl.
| | |
|---|---|
| *G01C 25/00* | (2006.01) |
| *G06F 1/26* | (2006.01) |
| *G05F 1/70* | (2006.01) |
| *H04L 12/10* | (2006.01) |
| *G06F 1/30* | (2006.01) |
| *G06F 1/28* | (2006.01) |
| *G05B 13/02* | (2006.01) |

(52) U.S. Cl.
CPC .................. *G06F 1/26* (2013.01); *G05F 1/70* (2013.01); *G06F 1/28* (2013.01); *G06F 1/305* (2013.01); *H04L 12/10* (2013.01); *G05B 13/02* (2013.01)

(58) Field of Classification Search
CPC ............... G06F 1/26; G05F 1/70; H04L 12/10
USPC ........................................................ 702/116
See application file for complete search history.

(56) References Cited

U.S. PATENT DOCUMENTS

| | | | | |
|---|---|---|---|---|
| 2004/0233458 | A1* | 11/2004 | Frick ...................... | G01D 5/268 356/480 |
| 2009/0292490 | A1* | 11/2009 | McElfresh ........... | G01R 31/002 702/66 |
| 2009/0295405 | A1* | 12/2009 | Pommerenke ..... | G01R 29/0878 324/627 |
| 2010/0332199 | A1* | 12/2010 | Dhanekula .......... | G06F 11/0751 703/2 |
| 2012/0169132 | A1* | 7/2012 | Choudhary ........... | H03J 1/0091 307/104 |
| 2014/0008995 | A1* | 1/2014 | Kanno .................. | H01F 27/362 307/104 |
| 2017/0207824 | A1* | 7/2017 | Von Novak, III ...... | H04W 4/80 |
| 2018/0001105 | A1* | 1/2018 | Botsford .................. | A61N 2/02 |

OTHER PUBLICATIONS

Organic Regulations, USDA, pp. 1-3. Printed on Apr. 2, 2000.*
V.J. Reddi et al, "Voltage Noise in Production Processors" *IEEE Micro*, vol. 31, Issue 1, Jan.-Feb. 2011 (date of publication Dec. 10, 2010), pp. 20-28.
Y. Kim et al, "AUDIT: Stress Testing the Automatic Way" *2012 45th Annual IEEE-ACM International Symposium on Microarchitecture*, Dec. 1-5, 2012, pp. 212-223.

(Continued)

*Primary Examiner* — Michael P Nghiem
(74) *Attorney, Agent, or Firm* — Nixon & Vanderhye P.C.

(57) ABSTRACT

A power analysis apparatus includes antenna circuitry gathers readings of electromagnetic waves that emanate from a power delivery network of a circuit to be analysed. Spectral analysis circuitry analyses the readings to determine a resonance frequency from said electromagnetic waves and processing circuitry performs one or more actions based on the resonance frequency.

16 Claims, 11 Drawing Sheets

(56) References Cited

OTHER PUBLICATIONS

S. Polfliet et al, "Automated Full-System Power Characterization" *IEEE Micro*, vol. 31, Issue 3, May-Jun. 2011 (date of publication Apr. 21, 2011) pp. 46-59.

K. Ganesan et al, "MAximum Multicore POwer (MAMPO)—An Automatic Multithreaded Synthetic Power Virus Generation Framework for Multicore Systems" *Proceedings of 2011 International Conference for High Performance Computing, Networking, Storage and Analysis*, Nov. 12-18, 2011, 12 pages.

P.N. Whatmough et al, "An All-Digital Power-Delivery Monitor for analysis of a 28nm Dual-Core ARM Cortex-A57 Cluster" *2015 IEEE International Solid-State Circuits Conference*, Feb. 22-26, 2015, pp. 262-264.

S. Das et al, "Modeling and Characterization of the System-Level Power Delivery Network for a Dual-Core ARM Cortex-A57 Cluster in 28nm CMOS" *2015 IEEE/ACM International Symposium on Low Power Electronics and Design (ISLPED)*, Jul. 22-24, 2015, 6 pages.

V.J. Reddi et al, "Voltage Noise: Why It's Bad, and What to Do About It" *5th IEEE Workshop on Silicon Errors in Logic-System Effects (SELSE)*, Jan. 2009, 4 pages.

S. Corbetta et al, "System-Wide Reliability Analysis on Real Processor and Application under Vdd and T Stress" SELSE 2016.

R Callan, "A New Approach for Measuring Electromagnetic Side-Channel Energy Available to the Attacker in Modern on Processor-Memory Systems" *2015 9th European Conference on Antennas and Propagation(EuCAP)*, Apr. 13-17, 2015, 5 pages.

N. Sehatbakhsh et al, "Spectral Profiling: Observer-Effect-Free Profiling by Monitoring EM Emanations" *2016 49th Annual IEEE/ACM International Symposium on Microarchitecture(MICRO)*, Oct. 15-19, 2016, 11 pages.

D. Genkin et al, "Stealing Keys from PCs using a Radio: Cheap Electromagnetic Attacks on Windowed Exponentiation" posted Feb. 27, 2015, Updated Mar. 3, 2015, pp. 1-28.

M. Mitchell, "An Introduction to Genetic Algorithms" MIT Press 1998, 162 pages.

ARM Limited, "ARM® Versatile™ Express Juno r2 Development Platform (V2M-Juno r2)" Technical Reference Manual, Nov. 16, 2015, 150 pages.

A. Nazari et al, "EDDIE: EM-Based Detection of Deviations in Program Execution" *ISCA '17*, Jun. 24-28, 2017, pp. 1-13.

R Callan et al, "A Practical Methodology for Measuring the Side-Channel Signal Available to the Attacker for Instruction-Level Events" *Proceedings of the 47th Annual IEEE/ACM International Symposium on Microarchitecture(MICRO)*, Dec. 2014, pp. 242-254.

\* cited by examiner freq (MHz)

POWER ANALYSIS

TECHNICAL FIELD

The present disclosure relates to power analysis.

DESCRIPTION

A Power Delivery Network (PDN) is responsible, in certain circuits such as data processing circuits, for providing power to functional components. Such networks can experience voltage noise due to, for instance, sudden transitions in CPU current consumption. The varying level in voltage can have implications for transistor switching. For example, if voltage becomes too low then timing failures can occur. Similarly SRAM retention can fail and the functionality of the SRAM can also fail. If, however, the voltage becomes too high then other timing failures can occur. Additionally, the reliability of the transistors can be damaged as a consequence of the transistors becoming degraded. It is therefore desirable to be able to analyse and characterise the performance of the power delivery network and to either confirm that a design will generally meet the voltage requirements or else will be able to perform correction when such voltage requirements are not met. One previously proposed way to achieve this is to place an analogue-to-digital converter near the functional components and output data to a buffer. However, such a device must be placed during the design of the circuit. Furthermore, it should have a low impact on the power-grid. This results in the buffer being small, which in turn gives limited measurement resolution and range. Another previous proposition is to provide dedicated VDD and VSS pins. However, this is impractical to add to an existing circuit and, in any event, utilises C4 bumps and solder balls in the circuit, which are limited resources.

SUMMARY

Viewed from a first example configuration, there is provided a power analysis apparatus comprising: antenna circuitry adapted to gather readings of electromagnetic waves that emanate from a power delivery network of a circuit to be analysed; spectral analysis circuitry adapted to analyse said readings to determine a resonance frequency from said electromagnetic waves; and processing circuitry to perform one or more actions based on said resonance frequency.

Viewed from a second example configuration, there is provided a method of analysing the power analysis of circuit to be analysed, comprising: gathering readings of electromagnetic waves that emanate from a power delivery network of said circuit to be analysed; analysing said readings to determine a resonance frequency from said electromagnetic waves; and performing one or more actions based on said resonance frequency.

Viewed from a third example configuration, there is provided a power analysis apparatus comprising: means for gathering readings of electromagnetic waves that emanate from a power delivery network of said circuit to be analysed; means for analysing said readings to determine a resonance frequency from said electromagnetic waves; and means for performing one or more actions based on said resonance frequency.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
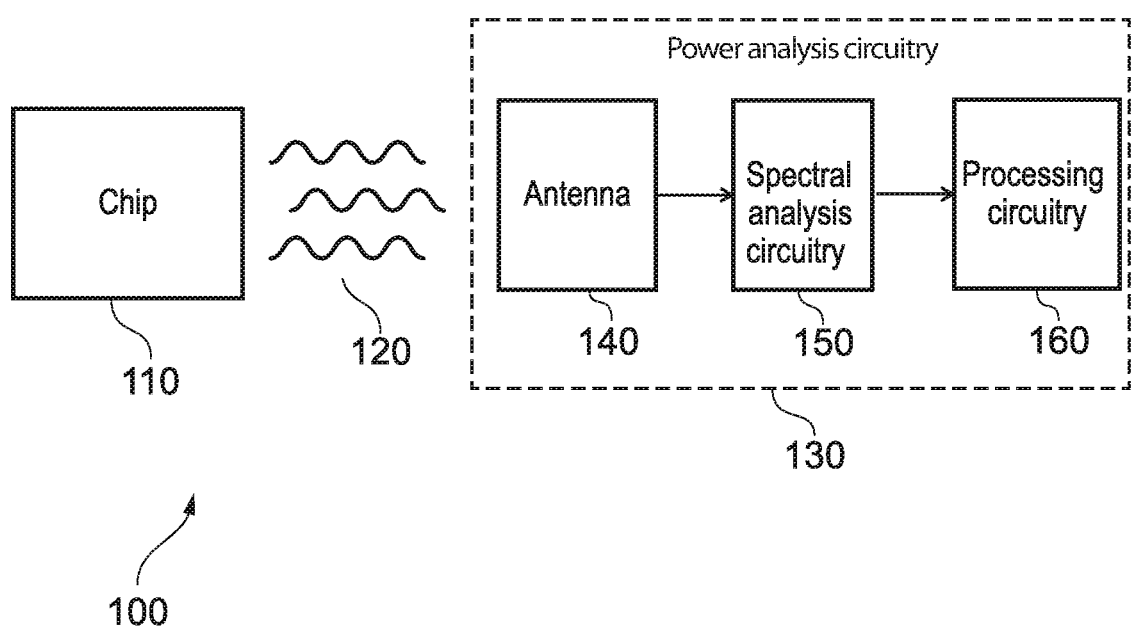
FIG. 1 illustrates a system comprising a chip or circuit to be analysed and a power analysis apparatus in accordance with some embodiments.

Before discussing the embodiments with reference to the accompanying figures, the following description of embodiments is provided.

In accordance with a first example configuration there is provided a power analysis apparatus comprising: antenna circuitry adapted to gather readings of electromagnetic waves that emanate from a power delivery network of a circuit to be analysed; spectral analysis circuitry adapted to analyse said readings to determine a resonance frequency from said electromagnetic waves; and processing circuitry to perform one or more actions based on said resonance frequency.

As a consequence of changing voltage and/or current in the PDN of a circuit to be analysed, one or more electromagnetic waves will be generated. In the above example configuration, antenna circuitry is provided in order to detect these electromagnetic waves and thereby gather readings of them. Spectral analysis circuitry is then used in order to analyse these readings, which can be used in order to determine a resonance frequency from the electromagnetic waves. Based the resonance frequency (e.g. of the PDN of the circuit to be analysed) it is possible to make certain determinations about characteristics of the PDN of the circuit to be analysed. Consequently, power analysis can be performed. This can be performed having little or no impact on the PDN. Furthermore, this analysis can be formed non-invasively. In particular, it is not necessary to make adjustments to the circuitry during the design process in order to enable later analysis. There is also no need to provide dedicated voltage pins and analysis of existing circuits can be performed while using few if any of the resources within the PDN itself that provide or enable connectivity.

In some embodiments, said resonance frequency is a first order resonance frequency. A chip-package-PCB system may have multiple resonance frequencies. The first-order resonance frequency is, e.g. the highest resonance frequency leading to the maximum value of the power supply impedance. When the power grid oscillates at the first-order resonance frequency, maximum amplitude of oscillations can be observed.

In some embodiments, said spectral analysis circuitry performs a fourier transform on said readings in order to determine said resonance frequency, and said amplitude of said resonance frequency is proportional to an amplitude of a voltage change experienced by said circuit to be analysed. As a consequence of this transformation, an amplitude of the determined resonance frequency produced from the readings by the spectral analysis circuitry is proportional to or corresponds with an amplitude of a voltage change experienced by the circuit to be analysed. Such a voltage change is typically as a result of noise in the voltage provided by the PDN. For example, the fourier transform can obtain the frequency components of the time-domain signals captured by the antenna circuitry. Higher (e.g. maximum) amplitude of power supply oscillations on-chip translate to stronger (e.g. strongest) EM signals being emanated by the chip at the corresponding frequency. Consequently, the resonance frequency can manifest as the strongest frequency in the EM emanations. Such a voltage change may be experienced as a consequence of current being drawn from non-switching transistors, for instance.

In some embodiments, said one or more actions comprises comparing said resonance frequency to a predicted resonance frequency from said electromagnetic waves, and in response to said resonance frequency differing from said predicted resonance frequency by more than a threshold amount, generating a warning. During the design of the circuit to be analysed and/or the PDN, it may be possible to determine a predicted voltage change that will occur during the use of such circuitry. For example, the voltage change could be a maximum voltage drop. Based on this and the proportionality between the amplitude of the resonance frequency as measured by the spectral analysis circuitry, and voltage change, it is possible to predict a resonance frequency of the circuit as it operates. Accordingly, during the operation of the circuitry, if the resonance frequency that is measured by analysing the electromagnetic waves differs from this predicted resonance frequency by more than a threshold amount (e.g. an experimental error of 10%), then this could be indicative that one or more components in the PDN is damaged. For example, this could occur as the result of one of the transistors in the PDN having being broken, or a capacitor connection being broken in either the package or the PCB. Accordingly a warning can be provided. Such a warning could take the form of a message being provided to the user, a warning LED or siren being emitted, or other techniques that will be known to the skilled person. The voltage change that would be predicted as occurring during operation of the circuitry can be predicted by analysis of the underlying circuitry itself. For example, the number and placement of different transistors, use of metals in the path on the network, and their interconnections. Furthermore, experimental measurements can be used in order to determine these quantities. For example, the inductance and resistance of different parts of the circuitry could be measured in order to determine an estimated or predicted voltage change that occurs during the operation of the circuitry.

In some embodiments, said circuit to be analysed is a data processing circuit adapted to execute a plurality of instructions. Different instructions may cause different quantities of current to be drawn from the circuitry, depending on their switching activity. As the current draw changes, so too does the voltage provided by the PDN. Consequently, as a result of executing certain instructions, the voltage provided by the PDN can vary. This can cause voltage noise, which can in turn result in voltage drops.

In some embodiments, said plurality of instructions to be executed are structured as a loop. Although voltage changes (e.g. voltage drops) can occur as a consequence of merely executing a series of instructions, with each instruction having variances in the current that is drawn to execute those instructions, large voltage changes are particularly susceptible to loops, in which a particular set of instructions are executed a number of times. This can occur as a consequence of a resonance taking place, in which the repeated e.g. lowering of voltage at a given or predicted time interval over a period of time can cause that drop in voltage to increase over time. Consequently, the largest voltage drops are often caused as a consequence of loops of instructions.

In some embodiments, said power analysis apparatus comprises generation circuitry to provide said plurality of instructions to said data processing circuit, and said plurality of instructions comprise at least one instruction that consumes less power than a first threshold value immediately preceding or immediately proceeding at least one instruction that consumes more power than a second threshold value. One use of the power analysis apparatus is to provide "stress-test scenarios" in which a circuitry being analysed is pushed in order to determine worst-case scenarios for causing voltage changes. Similarly, it can be desirable to analyse the circuitry in order to determine whether it is capable of coping with such voltage changes. In the embodiments described, a plurality of instructions is provided by the circuit to be analysed. Those instructions include at least one instruction that consumes less power than a first threshold value and that at least one instruction immediately precedes or immediately proceeds at least one instruction that consumes more power than a second threshold value. The first threshold value is less than the second threshold value. In other words, the instructions comprise a number of low power instructions and a number of high power instructions that are contiguous with each other (in either order) this sudden change in power requirement can result in a sudden voltage change. By selecting the instructions appropriately, it may be possible to produce a large voltage change and thereby stress-test circuitry to be analysed.

In some embodiments, said power analysis apparatus comprises heuristic circuitry adapted to produce one or more heuristics based on the resonance frequency when executing said plurality of instructions, generation circuitry adapted to generate a further plurality of instructions based on said one or more heuristics, said one or more actions comprises said further plurality of instructions being output to said data processing circuit to be executed. One way in which the instructions can be selected in order to enable stress-testing, is by the use of heuristics. For example, a set of instructions can be provided to the processing circuitry to be executed. The resonance frequency produced can then be analysed, and the set of instructions can be modified on the basis of that resonance frequency. If the modification results in a larger resonance frequency being produced, a "better" set of heuristics results. This indicates that the modification made to the plurality of instructions to be executed had a desired result. Over time, by the use of such heuristics, it is possible to produce a plurality of instructions for which the resonance frequency will correspond with a large voltage drop.

In some embodiments, said power analysis apparatus comprises generation circuitry adapted to generate said plurality of instructions using an evolutionary operation, said one or more actions comprises determining a performance of said plurality of instructions, wherein said performance correlates with an amplitude of said resonance frequency. An evolutionary operation (such as an evolutionary algorithm) is a form of optimisation algorithm. Such an algorithm operates by taking a set of candidate solutions, mutating one or more of those solutions e.g. modifying the set of instructions in a plurality of instructions, determining the quality of each of those candidates (e.g. by analysing the resonance frequency), and then selecting a subset of those candidate to remain within the population. Over a period of time the mutation of such candidates and by keeping only those candidates that achieve the best solutions, a set of candidates is derived that have or exhibit the desired characteristics.

In some embodiments, said evolutionary operation is a genetic operation. Genetic operations (e.g. genetic algorithms) are a class of evolutionary operations (e.g. evolutionary algorithms). In particular, a genetic algorithm may implement the concept of crossover, in which parts of multiple candidates are combined with each other. In this way, it is anticipated that a part of a candidate that is considered to be particularly good can be combined with another part of a second candidate that is also considered to be quite good in order to produce a resulting candidate that includes both parts that would be expected to perform significantly better.

In some embodiments, there is provided a system comprising a power analysis apparatus according to the first example configuration; and said circuit to be analysed.

In some embodiments, such a system comprises an output port, wherein said one or more actions comprises outputting data regarding said resonance frequency of said electromagnetic waves via said output port. Data regarding the electromagnetic waves could be output to a device for further analysis or for operation of the circuitry to take place.

In some embodiments, said power analysis apparatus is physically separate from said circuit to be analysed. As a consequence of power analysis apparatus being non-invasive, it is possible for the power analysis apparatus to be physically separate from the circuit to be analysed. In particular, the circuitry that performs the power analysis need not physically contact any of the circuits to be analysed. In some embodiments, despite the physical separation, the power analysis apparatus and the circuit to be analysed may share a platform or sub straight.

In some embodiments, said power analysis apparatus is physically disconnected from said circuit to be analysed other than to allow communication from said power analysis apparatus to said circuit to be analysed. Such physical disconnection of the power analysis apparatus from the circuit to be analysed, means that electrical communication from the circuit to be analysed to the power analysis apparatus does not take place. Such communication is unnecessary, since the power analysis apparatus of these embodiments is non-invasive. In other words, there need not be any physical connection between the power analysis apparatus and the circuit to be analysed in order for the power analysis apparatus to analyse the power characteristics of the circuit to be analysed. However, communication from the power analysis apparatus to the circuit to be analysed may be permitted in order, for example, the power analysis apparatus to control the behaviour of the circuit to be analysed. This may be done in order to provide further information e.g. by controlling the circumstances in which the electromagnetic emanations take place, or can be used in order to improve the behaviour or performance of the circuit to be analysed.

In some embodiments, said power analysis apparatus comprises control circuitry to control a behaviour of said data processing circuit, wherein said one or more actions comprises controlling said behaviour to reduce an amplitude of said resonance frequency based on said resonance frequency. Based on the resonance frequency that is determined, the control circuitry is able to control the data processing circuit such that the resonance frequency is reduced. Given that an amplitude of the resonance frequency as measured by the spectral analysis circuitry is proportional to a change in amplitude of voltage of the power delivery network, reducing an amplitude of the resonance frequency will also reduce a sudden change in voltage provided by the power delivery network. This in turn can reduce the voltage noise on the circuit to be analysed and thereby improve its reliability.

There are a number of ways in which the control circuitry can reduce the amplitude of the resonance frequency (e.g. the voltage change). In some embodiments, said control circuitry is adapted to reduce said amplitude of said resonance frequency by stalling the circuit to be analysed (the data processing circuit). By stalling the data processing circuit, the voltage change is given an opportunity to "even out" and can thereby be smoothed over a period of time. Such a stall can also be used in order to interrupt any resonance. Accordingly, over a period of time, the voltage change need not worsen.

In some embodiments, said control circuitry is adapted to reduce said amplitude of said resonance frequency by reordering one or more of said plurality of instructions. As previously explained, certain instructions require greater current consumption than other instructions in data processing circuitry. In particular, instructions that require a number of processor cycles in order to execute tend to require lower currents that instructions that execute over one or a fraction of processor cycles. By evening out instructions that use large currents and instructions that use small currents, the average current consumption could be averaged or normalised over time. This in turn can reduce the likelihood of a sudden change in voltage provided by the power delivery network.

In some embodiments, said control circuitry is adapted to reduce said amplitude of said resonance frequency by inserting one or more NOP instructions into said plurality of instructions. A no-operation instruction (NOP instruction) is a "dummy" instruction that is used to cause the processing circuitry to take no action. Accordingly, the insertion of a NOP instruction can be used in order to reduce an immediate current requirement of the processing circuitry, and thereby allow voltage to even out over time.

In some embodiments, said control circuitry is adapted to reduce said amplitude of said resonance frequency by reducing a clock frequency of said data processing circuit. By reducing the clock frequency, circuitry is given longer for different switching operations to occur. As a consequence, changes in current consumption are made less sudden, and consequently voltage changes are reduced. Furthermore, additional time is given to instructions to execute, and so timing errors can be reduced.

Particular embodiments will now be described with reference to the figures.

FIG. 1 illustrates a system 100 comprising a chip or circuit 110 to be analysed. This might, for instance, be a data processing circuit, which executes a plurality of instructions. While the circuit 110 to be analysed/tested operates, it gives off electromagnetic emanations (e.g. waves) 120 as a consequence of the changes in current that occur. Power analysis circuitry according to some embodiments comprises an antenna 140 that detects the electromagnetic emanations 120 and provides corresponding readings. These are passed to a spectral analysis circuitry 150, which determines a resonance frequency from the electromagnetic emanations 120. Based on this spectral frequency, which is passed to the processing circuitry 160, one or more actions can be taken.

Figure 2:
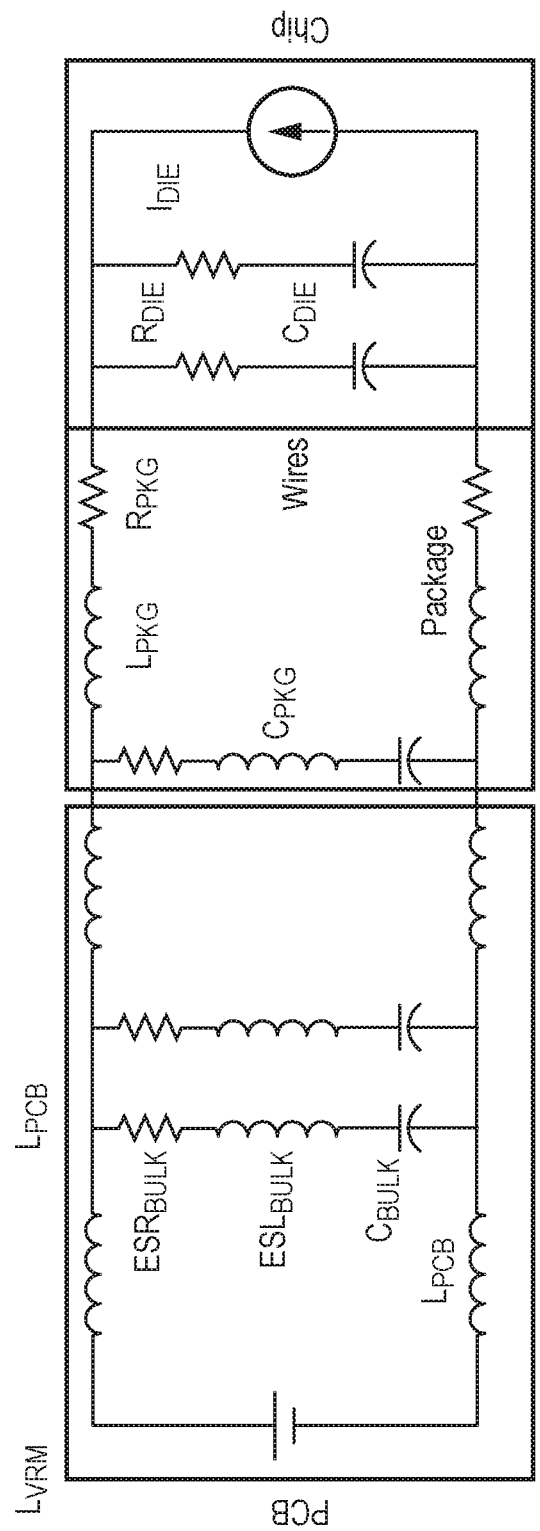
FIG. 2 shows a simplified representation of a Power Delivery Network.

FIG. 2 shows a simplified representation of a Power Delivery Network (PDN) composed of a die-package-PCB system, which comprises the circuit to be analysed 110. Switching transistors on the die are lumped together and modelled as a current source, $I_{DIE}$. Explicit on-die decoupling capacitors and non-switching transistors act as local charge reservoirs that are modelled by a capacitor, $C_{DIE}$. The power-line traces on the package and board are represented using R-L networks. Discrete decoupling capacitors (also referred to as decaps) on the package ($C_{PKG}$) and the bulk capacitors on the PCB ($C_{BULK}$) are modelled by capacitors in series with their effective series resistance (ESR) and inductance (ESL).

The following equation:

$$\Delta V_{DIE}(t) \cong 2 I_{max} R + I_{max} \sqrt{\frac{2 L_{PKG}}{C_{DIE}}} e^{\frac{-R}{2 L_{PKG}}} \sin(\omega_r - \theta)$$

shows the analytical solution for the voltage droop seen at the die supply rails for such a simplified model of the PDN. The voltage droop can be decomposed into a DC IRdrop term and an AC Ldi/dt term. The resistive component of the droop is addressed by increasing the metallization resources in the PDN. The inductive component is a complex trade-off between the package and the die and far exceeds the resistive droop magnitude in modern computing systems.

Figure 3:
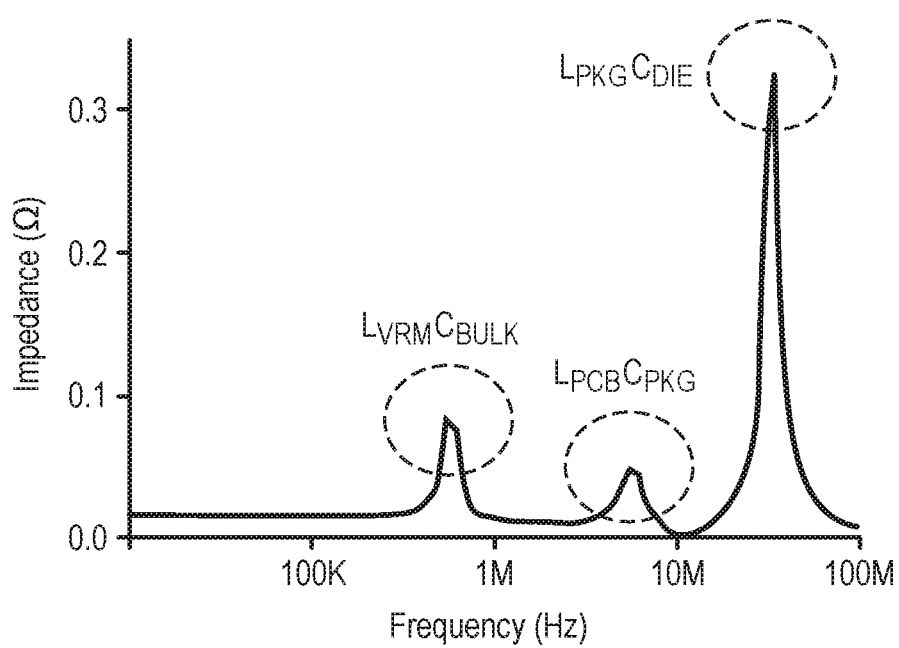
FIG. 3 shows the PDN input impedance (as seen from the die) as a function of frequency for the simplified PDN in FIG. 2.

FIG. 3 shows the PDN input impedance (as seen from the die) as a function of frequency for the simplified PDN in FIG. 2. The impedance spectrum shows three distinct impedance peaks due to each capacitor resonating with its counterpart inductor. The highest impedance peak, referred to as the first order resonance or dominant resonance, also occurs at the highest frequency (~100 MHz) and is due to the resonance between the die capacitance and the package inductance. The second and third-order resonances are due to downstream capacitor networks, and occur at relatively lower frequencies (~1 MHz and ~10 KHz for the 2nd and 3rd-order resonances, respectively).

Figure 4:
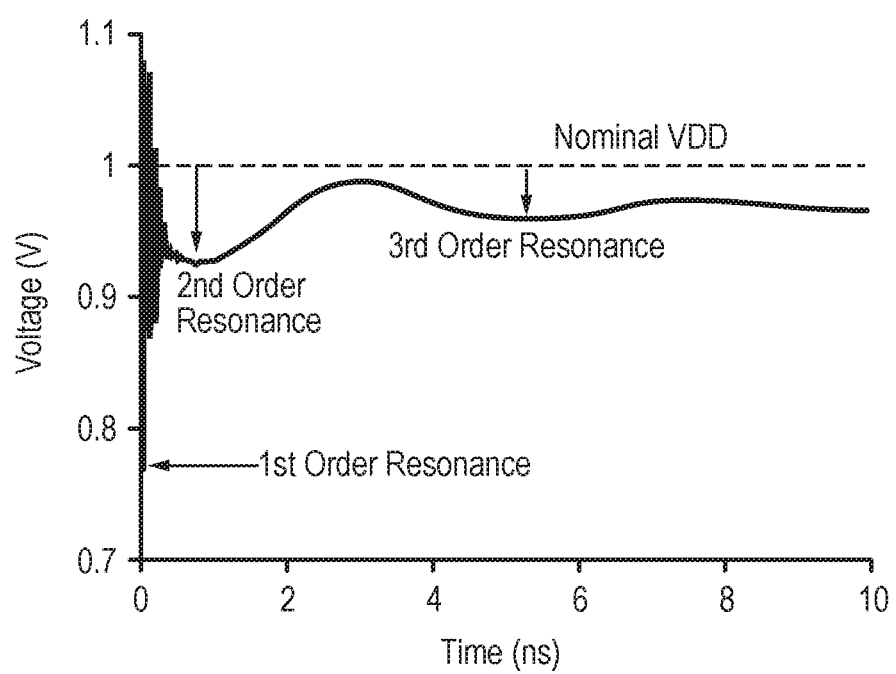
FIG. 4 illustrates micro-architectural events such as pipeline interlocks causing current-step excitations that exercise the three prominent system resonance frequencies in the PDN.

FIG. 4 illustrates micro-architectural events such as pipeline interlocks causing current-step excitations that exercise the three prominent system resonance frequencies in the PDN. The maximum magnitude of the voltage droop is caused due to the first-order resonance, which as such dominates the total timing margin.

Figure 5A:
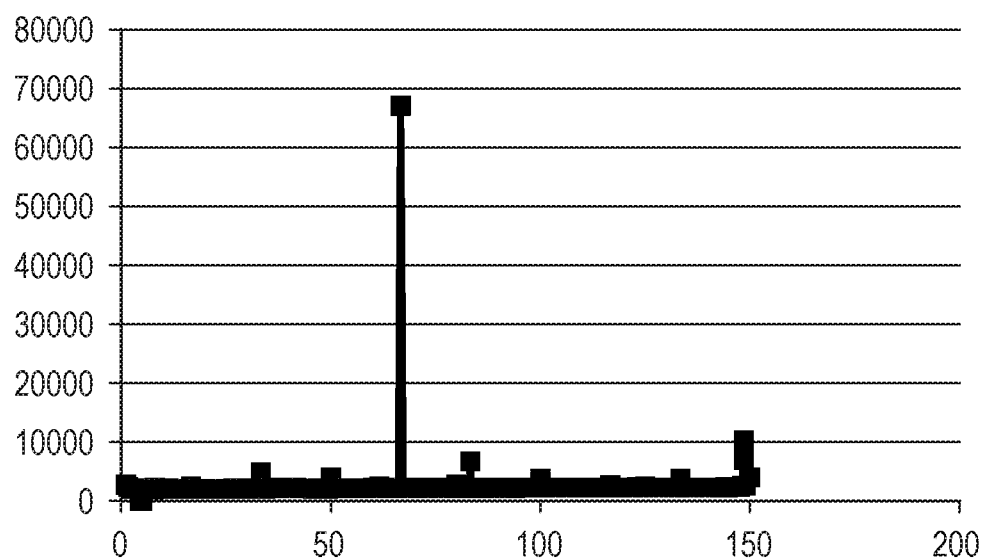
FIG. 5A is a graph that shows the output of spectral analysis circuitry regarding the electromagnetic emanation and FIG. 5B shows a corresponding output of performing a Fast Fourier Transform (FFT) of voltage readings from the same circuit.
Figure 5B:
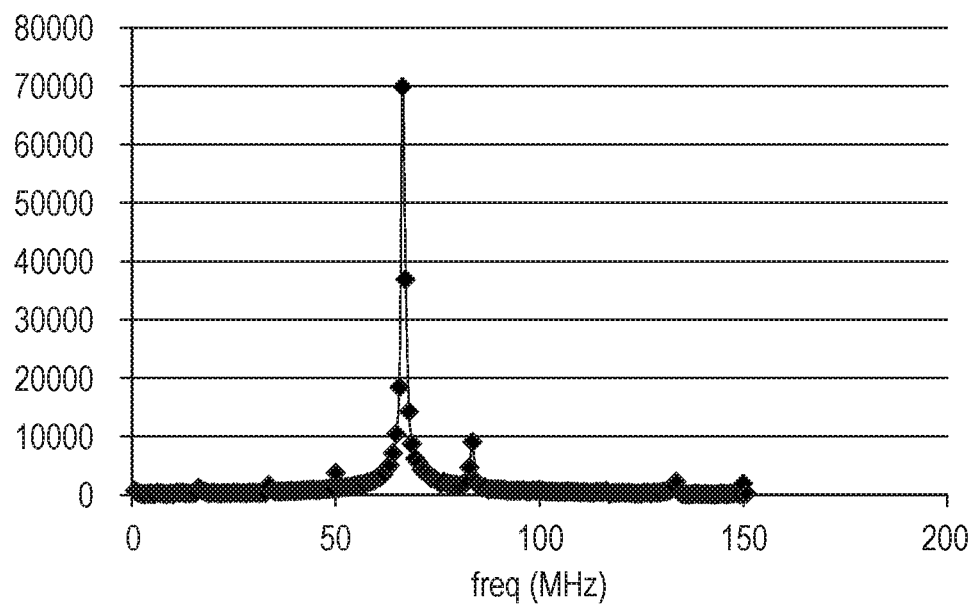

FIG. 5A is a graph that shows the output of spectral analysis circuitry performing a Fast Fourier Transform (FFT) of the electromagnetic emanation readings from a processing circuit executing a set of instructions having a base loop frequency of 16.66 MHz (60 ns period). The results show a dominant frequency at 66.66 MHz (15 ns) and other visible spikes at 33, 50, and 84 MHz. FIG. 5B shows a corresponding output of performing an FFT of voltage readings from the same circuit during execution of the same instructions. Both measurements indicate a similar dominant frequency and also indicate other similar less dominant spikes, indicating that the EM signals correspond with voltage noise.

Having shown that the electromagnetic emanations are indicative of the voltage being supplied by the Power Supply Network, and having shown that this can be achieved without the need for invasive circuitry, there are a number of ways in which this information can be used.

One way in which such information can be used is to generate a set of instructions for the chip or circuitry to be analysed 110 to execute that seeks to obtain a large change in voltage. Such instructions can be used to stress-test the circuitry 110 to test that the circuitry continues to work despite sudden and/or repeated changes in voltage.

Figure 6:
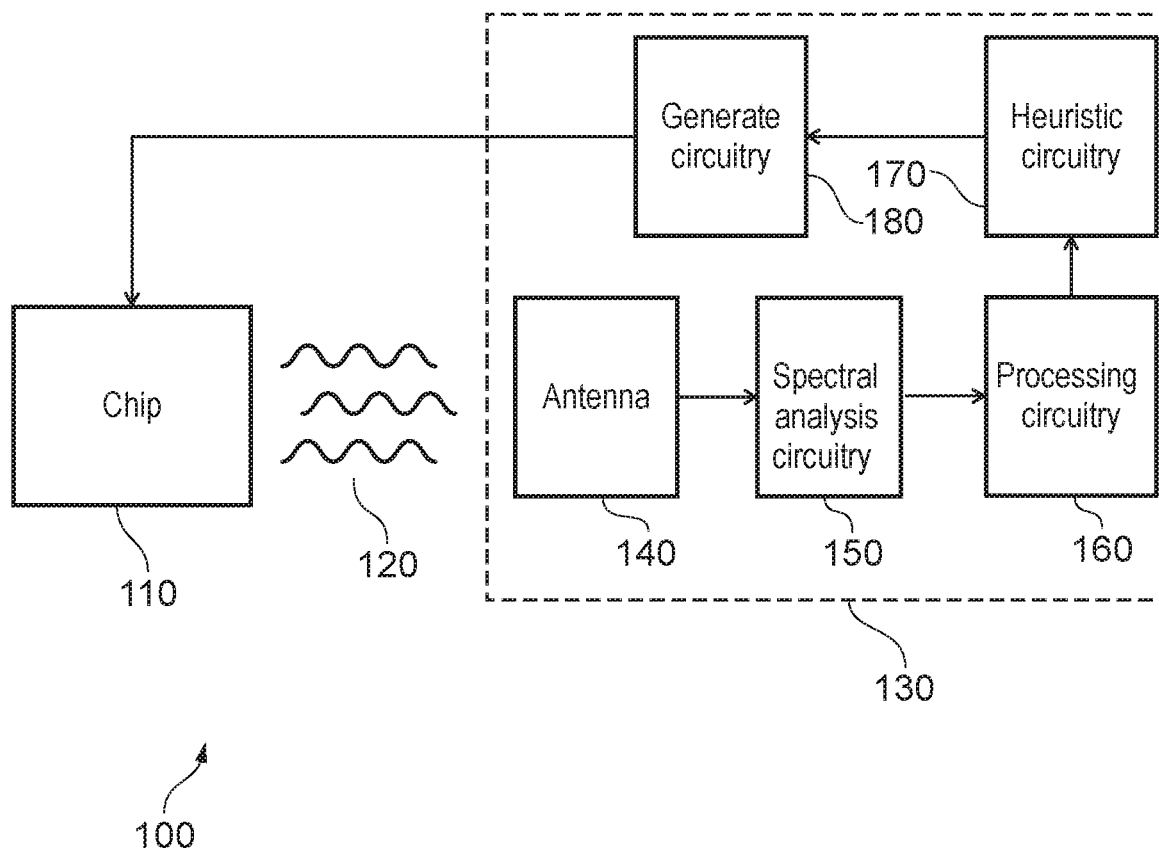
FIG. 6 shows a system 100 comprising power analysis circuitry 130 in accordance with some embodiments.

FIG. 6 shows a system 100 comprising power analysis circuitry 130. Within the power analysis circuitry 130 is heuristic circuitry 170 that receives data from the processing circuitry 170. The heuristic circuitry 170 produces one or more heuristics. In this example, the heuristic indicates the ability of the instructions being executed by the circuitry 110 to produce a large resonance frequency (e.g. voltage change). The heuristics are passed to generation circuitry 180, which in turn generate a revised set of instructions for the circuitry being analysed 110 to execute. Those instructions are then passed to the circuitry 110 to execute. This in turn results in a new resonance frequency being produced, and a new set of heuristics being produced. This therefore implements a feedback loop in which, over time, the heuristics can be used in order to improve the ability of the generated instructions to produce voltage drops when executed on the circuitry to be tested 110.

There are a number of different heuristic algorithms that can be used in order to assess the quality of a plurality of instructions. In some embodiments, the heuristic circuitry 170 and generation circuitry 180 collectively utilise an evolutionary algorithm. An evolutionary algorithm is used for solving optimisation problems. In particular, an evolutionary algorithm takes a number of candidates from a population (each candidate being a set of instructions). Some of those candidates are then mutated or varied. Such mutations could involve using different instructions, changing the order of the instructions, removing instructions, etc. and this creates a set of new candidates. The population is then tested. In this case, each set of instructions is executed, and the amplitude of the resonance frequency measured. The amplitude of the resonance frequency acts as a 'score' that indicates the quality of the instructions. Then, a subset of the population is kept on. This will at least be biased based on the higher performing members of the population, so as to encourage the use and further modification of candidates that performed well. This process is repeated a number of times. Over time, the population is expected to improve in quality.

One particular type of evolutionary algorithm that is used in some algorithms is a genetic algorithm. Genetic algorithms are a class of evolutionary algorithm, in which candidates (or parts of candidates) can be merged to form new candidates. In this way, it might be expected that parts of a candidate that result in the candidate performing well are combined with other parts of other candidates that result in those other candidates performing well. The expected result would be a merged candidate having multiple parts, each of which individually is expected to produce good results, and therefore the merged candidate might be expected to perform even better than the constituent candidates.

Note that although in the embodiment shown in FIG. 6, the processing circuitry 160, heuristic circuitry 170, and generation circuitry 180 are shown as separate functional blocks, there is no obligation that this is so. In some embodiments, one or more of these blocks could be combined.

Figure 7:
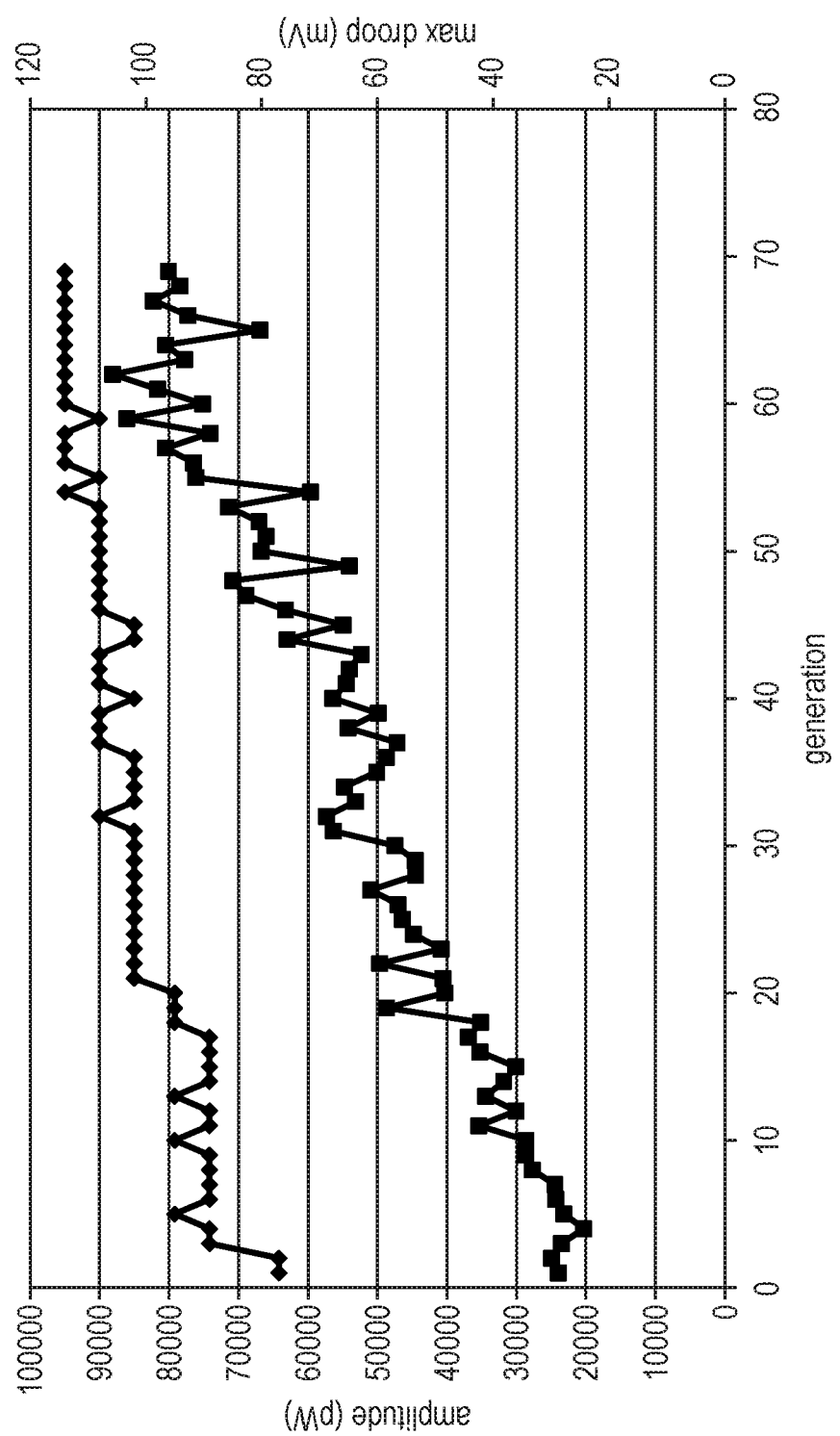
FIG. 7 illustrates the performance of a genetic algorithm over 70 generations.

FIG. 7 illustrates the performance of a genetic algorithm over multiple generations. In each generation, the top performing candidate is plotted. The top line indicates the maximum voltage droop when executing the instructions of the top performing candidate and the bottom line indicates the amplitude of the resonance frequency. The graph clearly shows that, over time, the maximum voltage droop and the amplitude of the resonance frequency both increase. Indeed, the lines in question are generally straight (although have different gradients) indicating that there is also a positive correlation between the maximum experienced voltage droop and the peak amplitude of the resonance frequency. Indeed, this indicates that one is proportional to the other.

In some embodiments, information regarding the resonance frequency is used in order to modify behaviour of the circuitry 110 to be tested.

Figure 8:
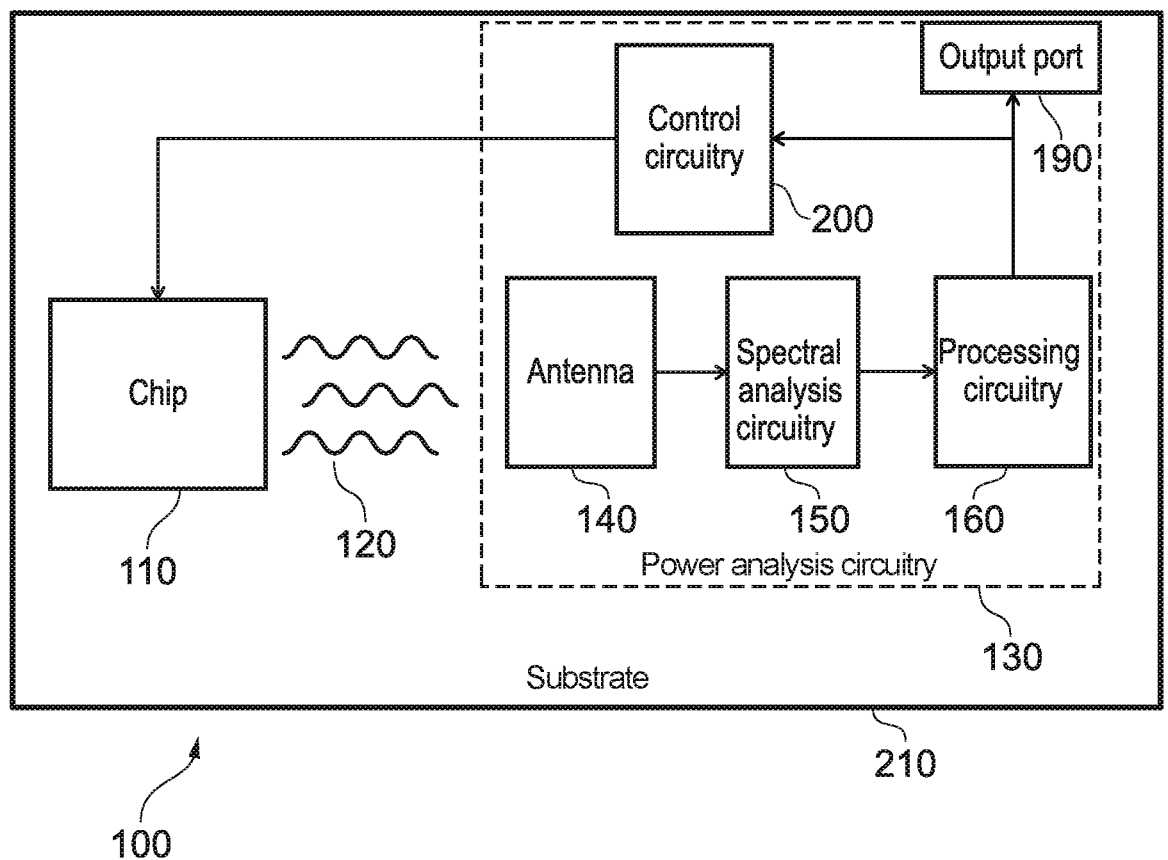
FIG. 8 shows power analysis circuitry comprising control circuitry that controls the behaviour of the circuitry to be analysed in accordance with some embodiments.

FIG. 8 shows power analysis circuitry 130 comprising control circuitry 200 that controls the behaviour of the circuitry to be analysed 110. In this embodiment, an output port 190 is also provided. The output port can be used to output data provided by the processing circuitry 160 such as the resonance frequency or other deductions made from the resonance frequency. It will be appreciated that other embodiments described herein could also implement an output port 190.

There are a number of different ways in which the control circuitry 200 can control the behaviour of the circuit to be tested 110.

Figure 9:
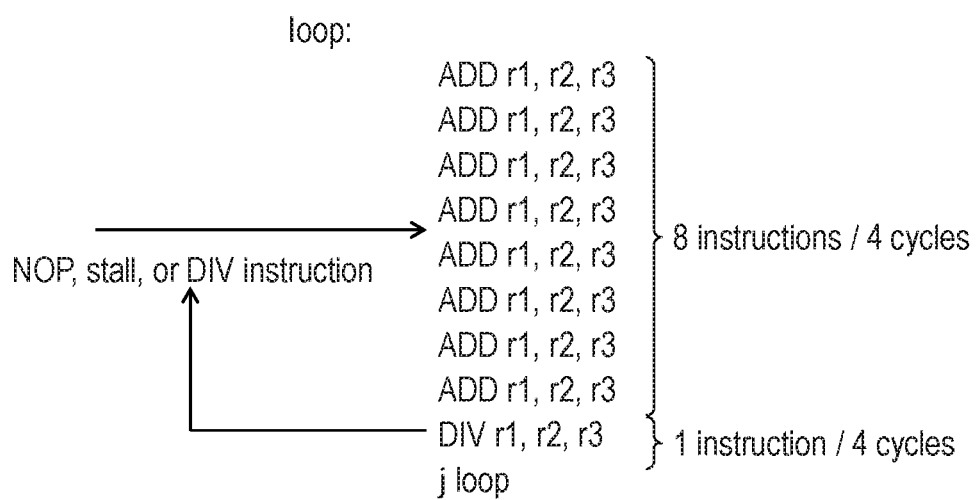
FIG. 9 shows a number of instructions formed as a loop and ways in which the loop can be altered in accordance with some embodiments.

FIG. 9 shows a number of instructions formed as a loop. The loop includes 8 ADD instructions, each of which executes in half a processor cycle, and one division instruction that executes over 4 processor cycles. In general, the more processor cycles that an instruction requires, the less current is drawn in order to execute those instructions. Accordingly, the loop of FIG. 9 includes a series of high power instructions followed by a low power instruction. The last instruction in the loop ("j loop") causes the set of instructions begin again. As a consequence of suddenly changing from a period of high power consumption to a period of low power consumption, one might expect a correspondingly large change in power consumption. Similarly, the presence of such instructions within a loop can cause a resonance to occur. In particular, over a number of iterations of the loop, the voltage change might be expected to grow. Note that in this embodiment, the circuit to be tested 110 and the power analysis circuitry 130 are provided on the same substrate 210. In this embodiment, the two components are physically distinct, and are only connected to the extent required to enable the control of the circuit to be tested 110 by the control circuitry 200. In other words, the power analysis circuitry 130 cannot directly analyse the voltage of the circuit to be tested 110.

One way in which the circuit to be tested 110 can be controlled in order to prevent such voltage changes from occurring is to insert a NOP (no operation) instruction or a stall into the set of instructions. For example, these could be inserted between the low power and high power instructions, or could be inserted into the middle of the high power instructions in order to provide a "break" from executing at high power consumption for a brief period. Another option would be to rearrange the instructions. For example, the lower power division instruction could be moved to the middle of the add instructions, thereby better distributing the power consumption over time.

Figure 10:
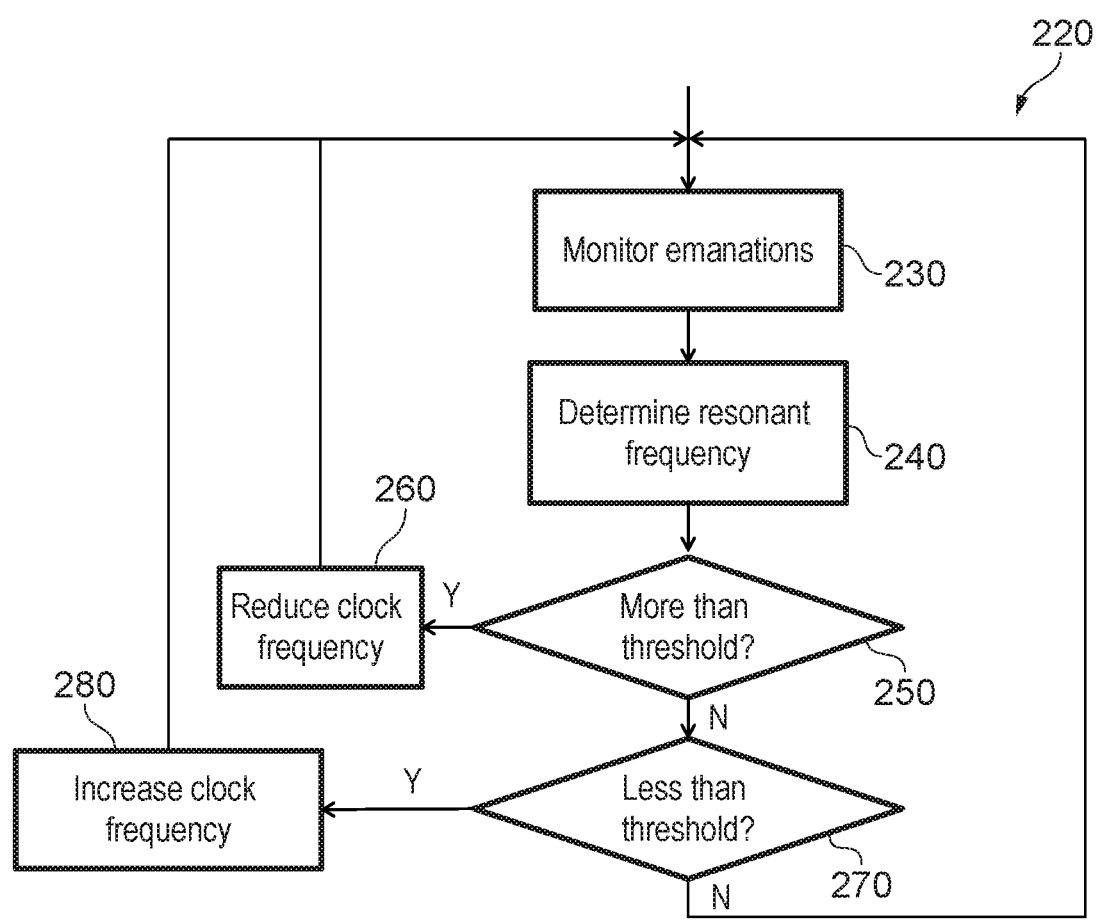
FIG. 10 illustrates a flow chart that shows yet another way in which the circuit to be tested can be controlled on the basis of the resonance frequency.

FIG. 10 illustrates a flow chart 220 that shows yet another way in which the circuit to be tested 110 can be controlled on the basis of the resonance frequency. In particular, at a step 230, electromagnetic emanations from the circuit to be tested are detected. At a step 240, a resonance frequency is determined. This can be achieved by the means of a fourier transform operation such as a fast fourier transform. At a step 250, it is determined whether this resonance frequency is more than a first threshold value, i.e. more than a point at which a large voltage drop might be expected. If so, then at step 260, the clock frequency is reduced. This in turn reduces the current that is drawn and consequently reduces any change in voltage. The process then returns to step 230. Alternatively, if the resonance frequency is not more than the first threshold, then at step 270, it is determined whether the resonance frequency is less than a second threshold. This second threshold could represent an acceptable level of voltage change that the circuitry to be tested is capable of handling. If the resonance frequency is less than this second threshold then at a step 280, the clock frequency is increased. This in turn increases any voltage change that occurs. In either event, the process then returns to step 230.

Figure 11:
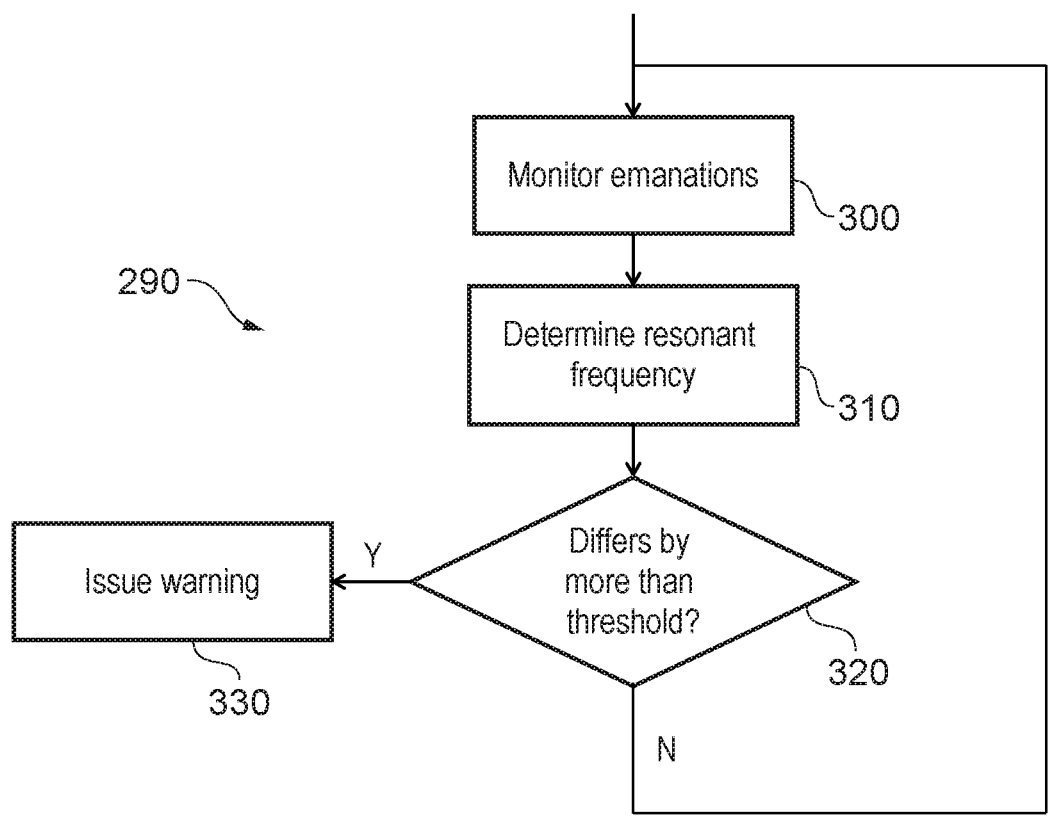
FIG. 11 illustrates a flow chart that shows a way of testing the circuit to be tested for damage in accordance with some embodiments.

FIG. 11 illustrates a flow chart 290 that shows a way of testing the circuit to be tested 110 for damage. At a step 300, electromagnetic emanations from the circuit to be tested 110 are detected. At a step 310, a resonance frequency is determined. This can be achieved by the means of a fourier transform operation such as a fast fourier transform. Then, at step 320, the amplitude of the resonance frequency is compared to a predetermined design value. This value corresponds with an expected maximum voltage change that can occur on the circuitry to be tested 110. It may be determined using experimental data (e.g. by actually analysing the voltage changes on the circuitry 110, if this is possible) or by theoretical analysis, such as by using the model illustrated in FIG. 2. In any event, the amplitude of the resonance frequency is converted to a voltage, and then it is determined whether this converted value differs from the design value by more than a threshold. If so, this indicates that the PDN of the circuitry 110 is not acting properly, which may suggest damaged transistors, or other electrical problems within the PDN. Otherwise, no fault is detected and the process can return to step 230 for the analysis to begin again, for instance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The project leading to this application has received funding from the European Union's Horizon 2020 research and innovation programme under grant agreement No 688540.

We claim:

1. A power analysis, comprising:
   antenna circuitry adapted to gather readings of electromagnetic waves that emanate from a power delivery network of a circuit to be analysed;
   spectral analysis circuitry adapted to analyse said readings to determine a resonance frequency of the power delivery network of the circuit to be analysed from said electromagnetic waves;
   processing circuitry to perform one or more actions regarding the power delivery network based on said resonance frequency;
   said circuit to be analysed is a data processing circuit adapted to execute a plurality of instructions;
   heuristic circuitry adapted to produce one or more heuristics based on the resonance frequency when executing said plurality of instructions; and
   generation circuitry adapted to generate a further plurality of instructions based on said one or more heuristics, wherein
   said one or more actions comprises said further plurality of instructions being output to said data processing circuit to be executed.

2. A power analysis apparatus according to claim 1, wherein
   said resonance frequency is a first order resonance frequency.

3. A power analysis apparatus according to claim 1, wherein
   said spectral analysis circuitry performs a Fourier transform on said readings in order to determine said resonance frequency; and
   an amplitude of said resonance frequency is proportional to an amplitude of a voltage change experienced by said circuit to be analysed.

4. A power analysis apparatus according to claim 1, wherein
   said one or more actions comprises comparing said resonance frequency to a predicted resonance frequency from said electromagnetic waves; and
   in response to said resonance frequency differing from said predicted resonance frequency by more than a threshold amount, generating a warning.

5. A data processing apparatus according to claim 1, wherein
   said plurality of instructions to be executed are structured as a loop.

6. A system comprising:
   said power analysis apparatus according to claim 1; and
   said circuit to be analysed.

7. A system according to claim 6, comprising:
   an output port, wherein
   said one or more actions comprises outputting data regarding said resonance frequency of said electromagnetic waves via said output port.

8. A power analysis apparatus according to claim 1, wherein
   said power analysis apparatus is physically separate from said circuit to be analysed.

9. A power analysis apparatus according to claim 1, wherein
   said power analysis apparatus is physically disconnected from said circuit to be analysed other than to allow communication from said power analysis apparatus to said circuit to be analysed.

10. A power analysis apparatus, comprising:
    antenna circuitry adapted to gather readings of electromagnetic waves that emanate from a power delivery network of a circuit to be analysed;
    spectral analysis circuitry adapted to analyse said readings to determine a resonance frequency of the power delivery network of the circuit to be analysed from said electromagnetic waves; and
    processing circuitry to perform one or more actions regarding the power delivery network based on said resonance frequency;
    said circuit to be analysed is a data processing circuit adapted to execute a plurality of instructions;
    generation circuitry adapted to generate said plurality of instructions using an evolutionary operation, wherein
    said one or more actions comprises determining a performance of said plurality of instructions,
    said performance correlates with an amplitude of said resonance frequency.

11. A power analysis apparatus according to claim 10, wherein
    said evolutionary operation is a genetic operation.

12. A power analysis apparatus, comprising:
    antenna circuitry adapted to gather readings of electromagnetic waves that emanate from a power delivery network of a circuit to be analysed;
    spectral analysis circuitry adapted to analyse said readings to determine a resonance frequency of the power delivery network of the circuit to be analysed from said electromagnetic waves; and
    processing circuitry to perform one or more actions regarding the power delivery network based on said resonance frequency;
    said circuit to be analysed is a data processing circuit adapted to execute a plurality of instructions;
    control circuitry to control a behaviour of said data processing circuit, wherein said one or more actions comprises controlling said behaviour to reduce an amplitude of said resonance frequency based on a clock frequency of said data processing circuit.

13. A power analysis apparatus according to claim 12, wherein
    said control circuitry is adapted to reduce said amplitude of said resonance frequency by stalling said data processing circuit.

14. A power analysis apparatus according to claim 12, wherein
    said control circuitry is adapted to reduce said amplitude of said resonance frequency by reordering one or more of said plurality of instructions.

15. A power analysis apparatus according to claim 12, wherein
    said control circuitry is adapted to reduce said amplitude of said resonance frequency by inserting one or more no operation (NOP) instructions into said plurality of instructions.

16. A power analysis apparatus according to claim 12, wherein said control circuitry is adapted to reduce said amplitude of said resonance frequency by reducing the clock frequency of said data processing circuit.

\* \* \* \* \*